US007668245B2

(12) United States Patent
Hofmeister et al.

(10) Patent No.: US 7,668,245 B2
(45) Date of Patent: Feb. 23, 2010

(54) METHOD AND DEVICE FOR MONITORING CARRIER FREQUENCY STABILITY OF TRANSMITTERS IN A COMMON WAVE NETWORK

(75) Inventors: Martin Hofmeister, Munich (DE); Christoph Balz, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 607 days.

(21) Appl. No.: 10/580,181

(22) PCT Filed: Oct. 20, 2004

(86) PCT No.: PCT/EP2004/011869

§ 371 (c)(1),
(2), (4) Date: May 22, 2006

(87) PCT Pub. No.: WO2005/050882

PCT Pub. Date: Jun. 2, 2005

(65) Prior Publication Data

US 2007/0104281 A1 May 10, 2007

(30) Foreign Application Priority Data

Nov. 21, 2003 (DE) ................................ 103 54 468

(51) Int. Cl.
*H04K 1/10* (2006.01)
*H04L 27/28* (2006.01)
*H04L 27/00* (2006.01)

(52) U.S. Cl. ...................................... 375/260; 375/259

(58) Field of Classification Search ................. 375/260, 375/259

See application file for complete search history.

(56) References Cited

U.S. PATENT DOCUMENTS

| | | | |
|---|---|---|---|
| 4,188,582 A | 2/1980 | Cannalte et al. | |
| 4,959,872 A * | 9/1990 | Imai et al. | 455/164.1 |
| 5,689,808 A * | 11/1997 | Sandahl et al. | 455/503 |
| 2002/0122210 A1* | 9/2002 | Mitchell Ilbery | 358/3.04 |

(Continued)

FOREIGN PATENT DOCUMENTS

DE 4330054 4/1994

(Continued)

OTHER PUBLICATIONS

Search report, Apr. 28, 2005.

*Primary Examiner*—David C Payne
*Assistant Examiner*—Brian J Stevens
(74) *Attorney, Agent, or Firm*—Ditthavong Mori & Steiner, P.C.

(57) ABSTRACT

The method for monitoring the stability of the carrier frequency ($\omega_i$) of identical transmitted signals ($s_i(t)$) of several transmitters $S_i$ of a single-frequency network is based upon a calculation of a carrier-frequency displacement $\Delta\omega_i$ of a carrier frequency $\omega_i$ of a transmitter $S_i$ relative to a carrier frequency $\omega_0$ of a reference transmitter $S_0$. For this purpose, the phase-displacement difference ($\Delta\Delta\Theta_i(t_{B2}-t_{B1})$) caused by the carrier-frequency displacement $\Delta\omega_i$ between a phase displacement $\Delta\Theta_i(t_{B1})$ at a first observation time $t_{B1}$ and a phase displacement $\Delta\Theta_i(t_{B2})$ at a second observation time $t_{B2}$ of a received signal ($e_i(t)$) of the transmitter $S_i$ associated with the respective transmitted signal ($s_i(t)$) is determined relative to a received signal $e_0(t)$ of the reference transmitter $S_0$ associated with the reference transmitted signal $s_0(t)$.

11 Claims, 6 Drawing Sheets

U.S. PATENT DOCUMENTS

| | | | | |
|---|---|---|---|---|
| 2002/0126046 | A1 * | 9/2002 | Counselman et al. | 342/464 |
| 2007/0036243 | A1 * | 2/2007 | D'Amico et al. | 375/340 |

FOREIGN PATENT DOCUMENTS

| | | |
|---|---|---|
| DE | 4341211 | 4/1995 |
| DE | 68928896 | 9/1999 |
| DE | 19937457 | 12/2001 |
| EP | 1063799 | 12/2000 |
| EP | 1335552 | 8/2003 |
| EP | PCT/EP2004/011869 | 8/2006 |

* cited by examiner

METHOD AND DEVICE FOR MONITORING CARRIER FREQUENCY STABILITY OF TRANSMITTERS IN A COMMON WAVE NETWORK

FIELD OF THE INVENTION

The invention relates to a method for monitoring the stability of the carrier frequency of several transmitters in a single-frequency network.

BACKGROUND OF THE INVENTION

Terrestrial digital radio and TV (DAB and DVB-T) are transmitted using digital multi-carrier methods (e.g. OFDM=orthogonal frequency division multiplexing) via a network of transmitters, which transmit within the transmission range in a phase-synchronous and frequency-synchronous manner via a single-frequency network.

For an efficient exploitation of the available frequency resources, all the transmitters of a single-frequency network simultaneously transmit an identical transmission signal. In addition to phase synchronicity, the identity of the carrier frequency to be transmitted in the individual transmitters must therefore also be guaranteed within a single-frequency network.

German published patent application no. DE 199 37 457 A1 discloses a method for monitoring the phase synchronicity of individual transmitters of a single-frequency network. The occurrence of a phase synchronicity of two transmitters is registered via a measurement of propagation-time difference by determining the channel impulse responses of both of the transmitters. If a large-scale deviation between the measured propagation-time difference of the two transmitters and a reference propagation-time difference for synchronous operation of the two transmitters is registered, then the transmitters are transmitting in an asynchronous manner. This deviation in the propagation-time difference is determined by a receiving station within the transmission range of the single-frequency network by evaluating the channel impulse responses and communicated to the two phase-asynchronous transmitters to allow subsequent synchronisation. A method for monitoring identical carrier frequencies in two transmitters within a single-frequency network is not disclosed in DE 199 37 457.

The synchronisation of transmitters in a single-frequency network with regard to an identical carrier frequency is described in German published patent application no. DE 43 41 211 C1. In this context, alongside the transmission data, a central system also transmits a frequency reference symbol to the individual transmitters of the single-frequency network. This frequency reference symbol is evaluated by every transmitter in the single-frequency network and is used to synchronise the carrier frequency with the reference frequency.

The disadvantage with this method is the fact that the synchronicity of the carrier frequency is evaluated by each transmitter individually. Accordingly, this transmitter-specific evaluation of the frequency synchronicity of the carrier frequency may be associated with a certain transmitter-specific measurement and evaluation error, which can lead to a non-uniform monitoring of the carrier frequencies of all the transmitters participating in the single-frequency network. Added to this is the fact that the monitoring of the carrier frequency in each individual transmitter necessitates a synchronisation of the individual transmitters by means of a time reference, which is received by the individual transmitter, for example, via GPS. Frequency synchronisation in the circuit arrangement according to DE 43 41 211 C1 finally takes place before modulation. A retrospective frequency displacement of the carrier frequency by subsequent functional units of the transmitter is therefore not excluded. All of these disadvantages can lead to an undesirable reception of different carrier frequencies of the individual transmitters in a receiver positioned anywhere within the transmission range of the single-frequency network.

SUMMARY OF THE INVENTION

There is a need, therefore, for a method and a device for monitoring the carrier frequency stability of transmitters in a single-frequency network, wherein the synchronicity of the carrier frequencies of the individual transmitters is monitored in a uniform manner by a single measurement arrangement, which can be positioned anywhere within the transmission range of the single-frequency network without a synchronisation of the measurement arrangement by means of a time reference.

According to an aspect of the invention, the carrier-frequency stability of the transmitter associated with a single-frequency network is monitored via a single receiver device, which is positioned anywhere within the transmission range of the single-frequency network. The receiver device determines the characteristic of the summated impulse response of all transmitters at two different times from the transmission function of the transmission channel, preferably using the inverse complex Fourier transform. The impulse responses associated with each transmitter are masked out of the two summated impulse responses after their phase position has been compared with the phase position of the two impulse responses of a reference transmitter of the single-frequency network. The phase characteristics of the two impulse responses associated with each transmitter are then determined. The phase-displacement difference of the impulse responses of each transmitter relative to the phase position of the impulse response of the reference transmitter between two observation times is once again derived from these phase characteristics. The carrier-frequency displacement of every transmitter relative to the carrier frequency of a reference transmitter of the single-frequency network can be calculated from the characteristic of the phase-displacement difference, as shown in greater detail below.

To allow an unambiguous identification of a permanent carrier-frequency displacement in a transmitter of the single-frequency network, the summated impulse responses of all transmitters are implemented repeatedly from the transmission function of the transmission channel by applying the inverse complex Fourier transform at several different times. The carrier-frequency displacement of every transmitter relative to the carrier frequency of a reference transmitter of the single-frequency network is calculated repeatedly on this basis and supplied for subsequent averaging.

If the phase-displacement difference of a transmitter decreases between two times to a value smaller than $-\pi$, or if the phase-displacement difference of a transmitter rises between two times to a value greater than $+\pi$, then the value of the phase-displacement difference of each transmitter between two times within this time segment is increased by the value $+2*\pi$ or respectively reduced by $2*\pi$. In this manner, the phase-displacement difference is limited to values between $-\pi$ and $+\pi$.

The impulse response of every transmitter of the single-frequency network is obtained by determining the coefficients of the transmission function of the transmission channel from the coefficients of the equaliser adapted to the transmission channel in the receiver device. This is followed by a calculation of the inverse Fourier transform. In the case of digital terrestrial TV (DVB-T), the impulse response for every transmitter can alternatively be derived from the inverse Fourier transform of the transmission function of the transmission channel by evaluating the OFDM-modulated transmission signals associated with the scattered pilot carriers.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Two embodiments of the invention are illustrated in the drawings and described in greater detail below. The drawings are as follows.

DETAILED DESCRIPTION OF THE PREFERRED EMBODIMENT

The method according to the invention for monitoring the carrier-frequency stability of transmitters in a single-frequency network is described below on the basis of two embodiments with reference to FIGS. 1 to 5.

Figure 1:
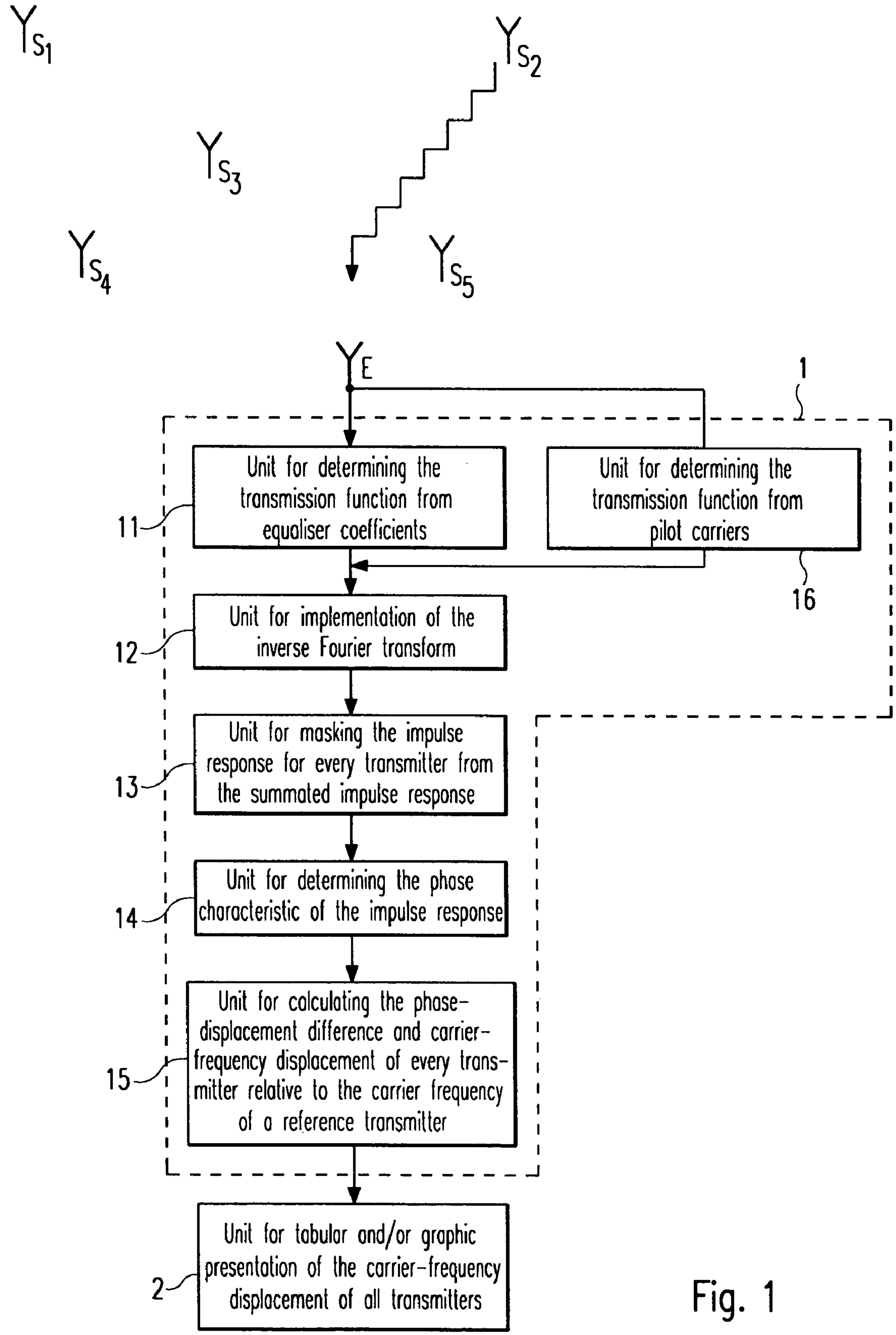
FIG. 1 shows a functional presentation of a device according to the invention for monitoring the carrier-frequency stability of transmitters in a single-frequency network.

The transmitters $S_0, \ldots, S_i, \ldots, S_n$, for instance, according to FIG. 1, each of the transmitters $S_1$, $S_2$, $S_3$, $S_4$ and $S_5$ transmits an identical phase-synchronous and frequency-synchronous signal s(t), for example, within the context of digital radio and TV. A receiver device E, which is positioned within the transmission range of the single-frequency network, receives a received signal e(t) as a superimposition of all of the received signals $e_i(t)$ associated with the individual transmitters $S_0, \ldots, S_i, \ldots, S_n$. This superimposed received signal e(t) provides the following time characteristic according to equation (1):

$$e(t) = \sum_{i=0}^{n} e_i(t) = s(t) + \sum_{i=1}^{n} v_i * e^{j\Delta\omega_i^* t} * s(t - \tau_i) \tag{1}$$

Within the framework of the following description, the transmitter $S_0$ is defined by way of example as the reference transmitter of the single-frequency network. The attenuation and phase distortions, and the propagation times experienced by the transmitted signals s(t) of the individual transmitters $S_0, \ldots, S_i, \ldots, S_n$ in the transmission channel to the receiver device E, are compared respectively with the attenuation and phase distortion, and the propagation time of the reference transmitter $S_0$. The signal $e_0(t)$ of the reference transmitter $S_0$ received in the receiver device E in equation (1) therefore corresponds to its transmitted signal s(t).

The amplitude $v_i$ of the received signal $e_i(t)$ of the other transmitters $S_1$ to $S_n$ is derived according to equation (2) from the attenuation scaling as a quotient of the amplitude of the received signal $e_i(t)$ of the respective transmitter $S_i$ and the amplitude of the received signal $e_0(t)$ of the reference transmitter $S_0$:

$$V_i = |e_i/e_0| \tag{2}$$

The propagation-time difference $\tau_i$ of the transmitters $S_1$ to $S_n$ can be calculated according to equation (3) from the difference between the propagation time $t_i$ of the transmitter $S_i$ and the propagation time $t_0$ of the reference transmitter $S_0$:

$$\tau_i = t_i - t_0 \tag{3}$$

The propagation time differences $\tau_i$ of the individual transmitters $S_0$ to $S_n$ are based upon the following effects:

- different propagation times because of different distances between the respective transmitters $S_i$ and the receiver device E and
- different phase distortions of the transmitted signals s(t) of the respective transmitters $S_i$ over the different transmission distances to the receiver device E.

An additional phase displacement $\Delta\Theta_i$ between a transmitter $S_i$ and the reference transmitter $S_0$ can occur in the case of phase scaling of the received signal e(t), if, according to equation (4), a difference occurs in the carrier frequency $\omega_i$ of the respective transmitter $S_i$ relative to the carrier frequency $\omega_0$ of the reference transmitter $S_0$:

$$\begin{aligned} \Delta\Theta_i &= \Theta_i - \Theta_0 \\ &= \omega_i * t - \omega_0 * t \\ &= (\Delta\omega_i + \omega_0) * t - \omega_0 * t \\ &= \Delta\omega_i * t \end{aligned} \tag{4}$$

The carrier-frequency deviation $\Delta\omega_i$ of the respective transmitter $S_i$ relative to the carrier frequency $\omega_0$ of the reference transmitter $S_0$ leads, according to equation (4), to a phase displacement $\Delta\Theta_i(t)$ of the received signal $e_i(t)$ associated with the respective transmitter $S_i$.

Taking into consideration the correlation in equation (4), equation (1) is transformed for the time characteristic of the received signal e(t) according to equation (5)

$$e(t) = s(t) + \sum_{i=1}^{n} v_i * e^{j\Delta\Theta_i(t)} * s(t - \tau_i) \quad (5)$$

If it is assumed according to equation (6), that the time duration $\Delta t_B$ for the observation of the received signal $e_i(t)$ is substantially less than the duration for all phase rotations $\Delta\Theta_i(t)$ of the received signal $e_i(t)$ on the basis of a carrier-frequency displacement $\Delta\omega_i$ of the respective transmitter $S_i$, it can be assumed, that the phase displacement $\Delta\Theta_i$ of the received signal $e_i(t)$ is approximately constant within this time slot $\Delta t_B$.

$$\Delta t_B << 2*\pi/\max\{\Delta\omega_i\} \quad (6)$$

Equation (5) for time characteristic of the received signal e(t) is transformed into equation (7) for the time range of the time slot $\Delta t_B$.

$$e(t) = s(t) + \sum_{i=1}^{n} v_i * e^{j\Delta\Theta_i} * s(t - \tau_i) \quad (7)$$

Figure 2:
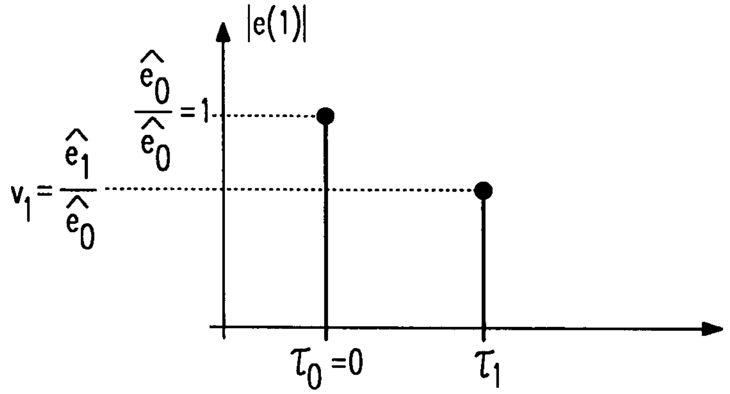
FIG. 2 shows an exemplary graphic presentation of the time-discrete, summated impulse response.

FIG. 2 shows the connection between the scaling of the received signal $e_i(t)$ of a transmitter $S_i$ relative to the received signal $e_0(t)$ of a reference transmitter $S_0$ with regard to attenuation and propagation time.

With a known transmission function of the transmission channel of the single-frequency network comprising the transmitters $S_0$ to $S_n$, the received signal e(t) can be understood through the summated impulse response $h_{SFN}(t)$ of the transmission channel of the single-frequency network composed of the respective impulse responses $h_{SFNi}(t)$ of the transmitters $S_0, \ldots, S_i, \ldots, S_n$ according to equation (8)

$$h_{SFN}(t) = \sum_{i=0}^{n} h_{SFN_i}(t) = \delta(t) + \sum_{i=1}^{n} v_i * e^{j\Delta\Theta_i} * \delta(t - \tau_i) \quad (8)$$

The frequency spectrum $E(\omega)$ of the received signal e(t) in equation (9) is derived from the Fourier transform of the received signal $h_{SFN}(t)$ according to equation (8) multiplied by the transmission function $S(\omega)$ of the transmission channel of the single-frequency network:

$$E(\omega) = S(\omega) * \left(1 + \sum_{i=1}^{n} v_i * e^{j\Delta\Theta_i} * e^{-j\omega\tau_i}\right) = S(\omega) * H_{SFN}(\omega) \quad (9)$$

The bracketed term of the frequency spectrum $E(\omega)$ of the received signal e(t) in equation (9) corresponds to the transmission function $H_{SFN}(\omega)$ of the transmission channel of the single-frequency network. This consists of a sum of indices, of which the phases change with the term $j\omega\tau_i$ and, for a given time t, provide a constant phase displacement $\Delta\Theta_i = \Delta\omega_i * t$.

Figure 3:
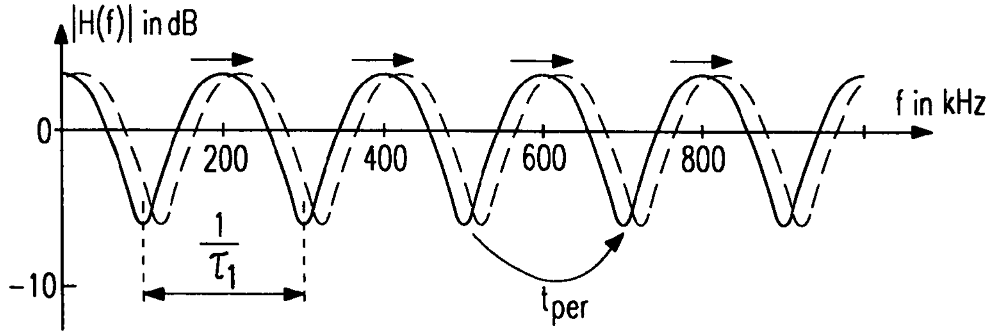
FIG. 3 shows an exemplary graphic presentation of a modification of the characteristic for the transmission function of the transmission channel.

The value of the transmission function $|H_{SFN}(f)|$ for a single-frequency network with a reference transmitter $S_0$ and a second transmitter $S_i$ is presented via the frequency f in FIG. 3. The value of the transmission function $|H_{SFN}(f)|$ provides a periodic curve characteristic with a period of $1/\tau_1$. The characteristic for the value of the transmission function $|H_{SFN}(f)|$ is displaced from a periodic curve characteristic at time $t=t_1$ (continuous line) to a similarly periodic curve characteristic of the same period at a later time $t=t_2>t_1$ (dotted line) because of the influence of the phase displacement $\Delta\Theta_i$ of the received signal $e_1(t)$ of the transmitter $S_1$ relative to the received signal $e_0(t)$ of the reference transmitter $S_0$ because of a carrier-frequency displacement $\Delta\omega_i$ of the transmitter $S_1$ relative to the carrier frequency $\omega_0$ of the transmitter $S_0$.

The rate of displacement of the characteristic for the absolute value of the transmission function $|H_{SFN}(f)|$ is determined through the carrier-frequency displacement $\Delta\omega_1$ of the transmitter $S_1$ relative to the carrier frequency $\omega_0$ of the reference transmitter $S_0$. The required time $t_{Per.}$ for the displacement of the characteristic for the value of the transmission function $|H_{SFN}(f)|$ through exactly one period of the absolute-value characteristic of the transmission function $|H_{SFN}(f)|$ is derived according to equation (10) using equation (4) assuming a phase displacement $\Delta\Theta_i$ of $2*\pi$ in the case of a full rotation of the phase displacement $\Delta\Theta_i$:

$$t_{Per} = 2*\pi/\Delta\omega_1 = 1/\Delta f_1 \quad (10)$$

If the transmission function $H_{SFN}(f)$ is observed in two different time slots $\Delta t_{B1}$ and $\Delta t_{B2}$, then, according to equation (4), the phase displacement $\Delta\Theta_i$ resulting from a carrier-frequency displacement $\Delta\omega_i$ of the transmitter $S_i$ relative to the carrier frequency $\omega_0$ of the reference transmitter $S_0$ changes in the transmission function $H_{SFN}(f)$ over the time t between the time slot $\Delta t_{B1}$ and the time slot $\Delta t_{B2}$, as does its characteristic over the frequency f. The characteristic of the summated impulse response $h_{SFN}(t)$ according to equation (8) corresponding to the transmission function $H_{SFN}(f)$ also changes in a similar manner.

With the change of the characteristic of the summated impulse response $h_{SFN}(t)$ in the case of a rotating phase displacement $\Delta\Theta_i(t)$ of the transmitter $S_i$ from the time slot $\Delta t_{B1}$ to the time slot $\Delta t_{B2}$, the characteristic of the impulse response $h_{SFNi}(t)$ of the transmitter $S_i$, of which the carrier frequency $\omega_i$ has been displaced relative to the carrier frequency $\omega_0$ of the reference transmitter $S_0$, also changes. The phase angle displacement $\Delta\Theta_i(t)$ of the impulse response $h_{SFNi}(t)$ associated with the transmitter $S_i$ from the time $t_{B1}$ of the time slot $\Delta t_{B1}$ to the time $t_{B2}$ of the time slot $\Delta t_{B2}$ is, according to equation (11), therefore proportional to the characteristic of the carrier-frequency displacement $\Delta\omega_i(t)$ of the transmitter $S_i$ relative to the carrier frequency $\omega_0$ of the reference transmitter $S_i$.

$$\Delta\Theta_i(t_{B2}) - \Delta\Theta_i(t_{B1}) = \Delta\omega_i(t) * (t_{B2} - t_{B1}) \quad (11)$$

For reasons of simplicity, it is assumed that the carrier-frequency displacement $\Delta\omega_i(t)$ between the two observation times $t_{B1}$ and $t_{B1}$ does not change. Subject to this reasonable assumption, equation (11) is transformed into equation (12).

$$\Delta\Theta_i(t_{B2}) - \Delta\Theta_i(t_{B1}) = \Delta\omega i * (t_{B2} - t_{B1}) \quad (12)$$

Figure 4A:
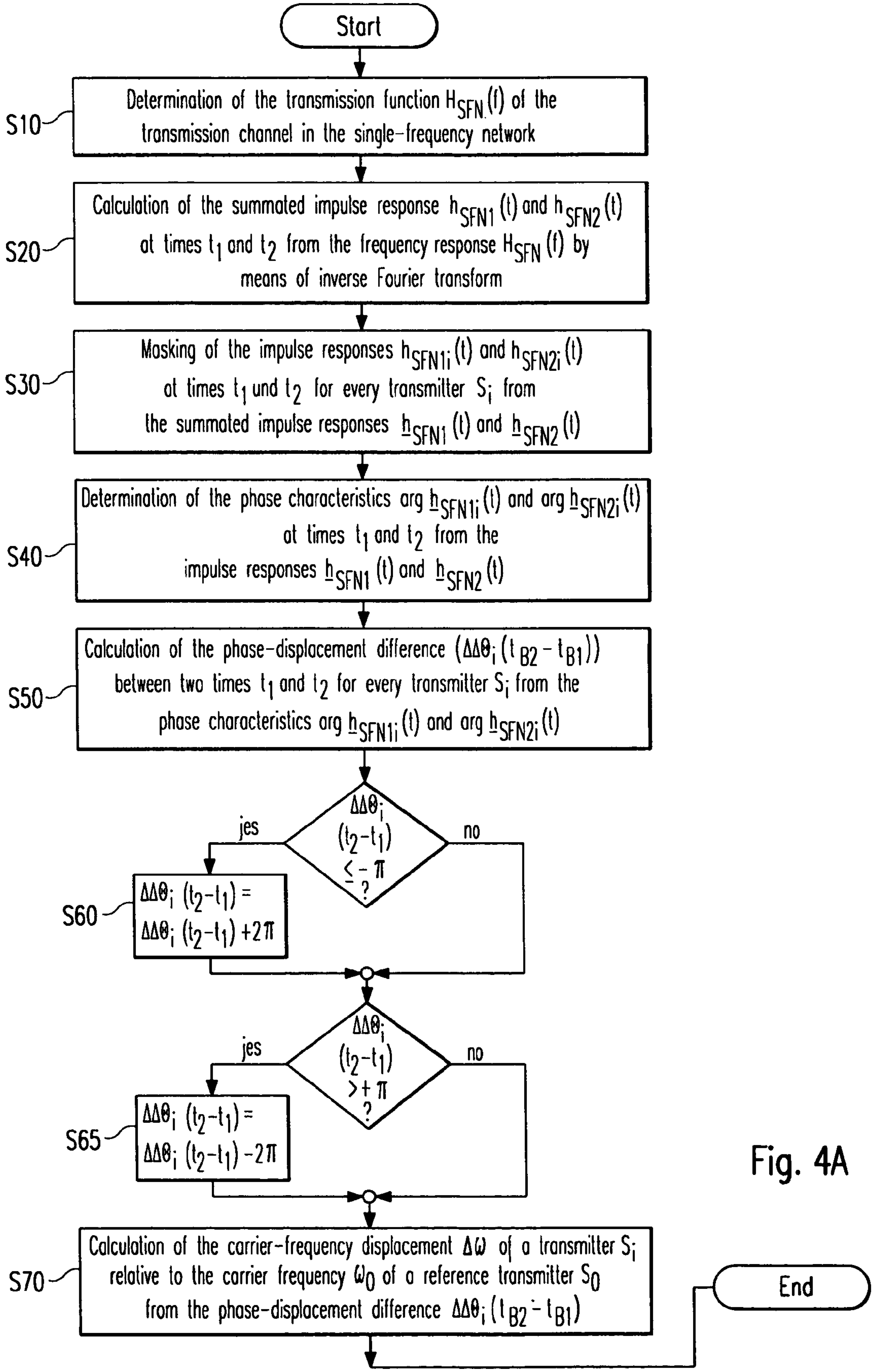
FIG. 4A shows a flow chart explaining the first embodiment of the method according to the invention for monitoring the carrier-frequency stability of transmitters in a single-frequency network.

The first embodiment for monitoring the carrier-frequency stability of transmitters in a single-frequency network is therefore derived from the procedural stages presented below, as shown in FIG. 4A:

In procedural stage S10, the transmission function $H_{SFN}(f)$ of the transmission channel of the individual transmitters $S_0, \ldots, S_1, \ldots, S_n$ of the single-frequency network to the receiver device E is determined. For this purpose, the characteristic of the transmission function $H_{SFN}(f)$ can be determined from the coefficients of the equaliser integrated in the receiver device E, which, in the case of an equaliser adapted to the transmission channel, correspond to the coefficients of the transmission function $H_{SFN}(f)$.

In procedural stage S20, the characteristics of the associated complex, summated impulse responses $h_{SFN1}(t)$ and $h_{SFN2}(t)$ at the two times $t_{B1}$ of the time slot $\Delta t_{B1}$ and $t_{B2}$ of the time slot $\Delta t_{B2}$ are calculated by means of discrete, inverse Fourier transform. In this context, time-discrete, complex, summated impulse responses $h_{SFN1}(t)$ and $h_{SFN2}(t)$ at individual sampling times t are involved.

The characteristics of the complex impulse responses $h_{SFN1}(t)$ and $h_{SFN2}(t)$, associated in each case with the transmitters $S_i$ participating in the single-frequency network, at the times $t_{B1}$ and $t_{B2}$, are filtered out of the two time-discrete characteristics of the complex, summated impulse responses $h_{SFN1}(t)$ and $h_{SFN2}(t)$ in procedural stage S30.

In the case of digital terrestrial TV, as an alternative to determining the transmission function $H_{SFN}(f)$ of the transmission channel from the coefficients of the equaliser integrated in the receiver device, as presented above, the transmission function $H_{SFN}(f)$ of the transmission channel can be determined from the DVB-T symbols of the scattered carrier pilots.

Each of these time-discrete characteristics of the impulse responses $h_{SFN1i}(t)$ and $h_{SFN2i}(t)$ of the respective transmitter $S_i$ at the times $t_{B1}$ and $t_{B2}$ is a complex numerical sequence. From these complex characteristics of the impulse responses $h_{SFN1i}(t)$ and $h_{SFN2i}(t)$, the associated time-discrete phase characteristics $\arg(h_{SFN1i}(t))$ and $\arg(h_{SFN2i}(t))$ of the respective transmitter $S_i$ at the times $t_{B1}$ and $t_{B2}$ are determined in procedural stage S40. Alternatively, the impulse response may not be allocated to the transmitters at this time, and only total impulse responses $h_{SFN1}(t)$ and $h_{SFN2}(t)$ are initially calculated.

By subtraction of the time-discrete phase characteristics $\arg(h_{SFN1i}(t))$ and $\arg(h_{SFN2i}(t))$ of the impulse responses $h_{SFN1i}(t)$ and $h_{SFN2i}(t)$ of the respective transmitter $S_i$ at the times $t_{B1}$ and $t_{B2}$, a phase-displacement difference $\Delta\Delta\Theta_i(t_{B2}-t_{B1})$ for the phase displacement of the respective transmitter $S_i$ relative to the reference transmitter $S_0$ between the times $t_{B2}$ and $t_{B1}$ is obtained; this phase-displacement difference is constant over time and corresponds to the difference of the phase displacement $\Delta\Theta_i(t_{B2})$ at the time $t_{B2}$ and the phase displacement $\Delta\Theta_i(t_{B1})$ at the time $t_{B1}$ of the transmitter $S_i$ relative to the reference transmitter $S_0$. In procedural stage S50, this is calculated according to equation (13) derived from equation (8):

$$\begin{aligned}\Delta\Delta\Theta_i(t_{B2}-t_{B1}) &= \arg(h_{SFN2i}(t)) - \arg(h_{SFN1i}(t)) \\ &= \Delta\Theta_i(t_{B2}) - \Delta\Theta_i(t_{B1})\end{aligned} \quad (13)$$

The phase-displacement difference $\Delta\Delta\Theta_i(t_{B2}-t_{B1})$ of the phase displacement of the transmitter $S_i$ relative to the reference transmitter $S_0$ between the times $t_{B1}$ and $t_{B2}$ can, under some circumstances, adopt values smaller than $-\pi$, which are disposed outside the acceptable value range. Accordingly, in time ranges, in which the phase-displacement difference $\Delta\Delta\Theta_i(t_{B2}-t_{B1})$ of the phase displacement of the transmitter $S_i$ relative to the reference transmitter $S_0$ between the times $t_{B1}$ and $t_{B2}$ adopts values smaller than $-\pi$, the phase-displacement difference $\Delta\Delta\Theta_i(t_{B2}-t_{B1})$ of the phase displacement according to equation (14) is increased in procedural stage S60 by the value $2*\pi$.

$$\Delta\Delta\Theta_i(t_{B2}-t_{B1})=\Delta\Delta\Theta_i(t_{B2}-t_{B1})-2\pi$$

$$\text{for values of } \Delta\Delta\Theta_i(t_{B2}-t_{B1})<=-\pi \quad (14)$$

If the phase-displacement difference $\Delta\Delta\Theta_i(t_{B2}-t_{B1})$ of the phase displacement of the transmitter $S_i$ relative to the reference transmitter $S_0$ between the times $t_{B1}$ and $t_{B2}$ adopts values greater than $+\pi$, which are disposed outside the acceptable value range, then the phase-displacement difference $\Delta\Delta\Theta_i(t_{B2}-t_{B1})$ of the phase displacement is reduced by the value $2*\pi$ in procedural stage S65 according to equation (15).

$$\Delta\Delta\Theta_i(t_{B2}-t_{B1})=\Delta\Delta\Theta_i(t_{B2}-t_{B1})-2*\pi$$

$$\text{for values of } \Delta\Delta\Theta_i(t_{B2}-t_{B1})>\pi \quad (15)$$

The limitations of the phase-displacement difference $\Delta\Delta\Theta_i(t_{B2}-t_{B1})$ of the phase displacement of the transmitter $S_i$ relative to the reference transmitter $S_0$ between the times $t_{B1}$ and $t_{B2}$ according to equations (13) and (14) implemented in procedural stages S60 and S65 guarantee an unambiguous phase value within the range from $-\pi$ to $+\pi$.

In procedural stage S70, the characteristic of the carrier-frequency displacement $\Delta\omega_i$ of the transmitter $S_i$ relative to the carrier frequency $\omega_0$ of the reference transmitter $S_0$ between the times $t_{B1}$ and $t_{B2}$, derived according to equations (12) and (13) from the phase-displacement difference $\Delta\Delta\Theta_i(t_{B2}-t_{B1})$ of the phase displacement of the transmitter $S_i$ relative to the reference transmitter $S_0$ between the times $t_{B1}$ and $t_{B2}$, is calculated according to equation (16).

$$\begin{aligned}\Delta\omega_i &= [\Delta\Theta_i(t_{B2}) - \Delta\Theta_i(t_{B1})]/(t_{B2}-t_{B1}) \\ &= \Delta\Delta\Theta_i(t_{B2}-t_{B1})/(t_{B2}-t_{B1})\end{aligned} \quad (16)$$

Figure 4B:
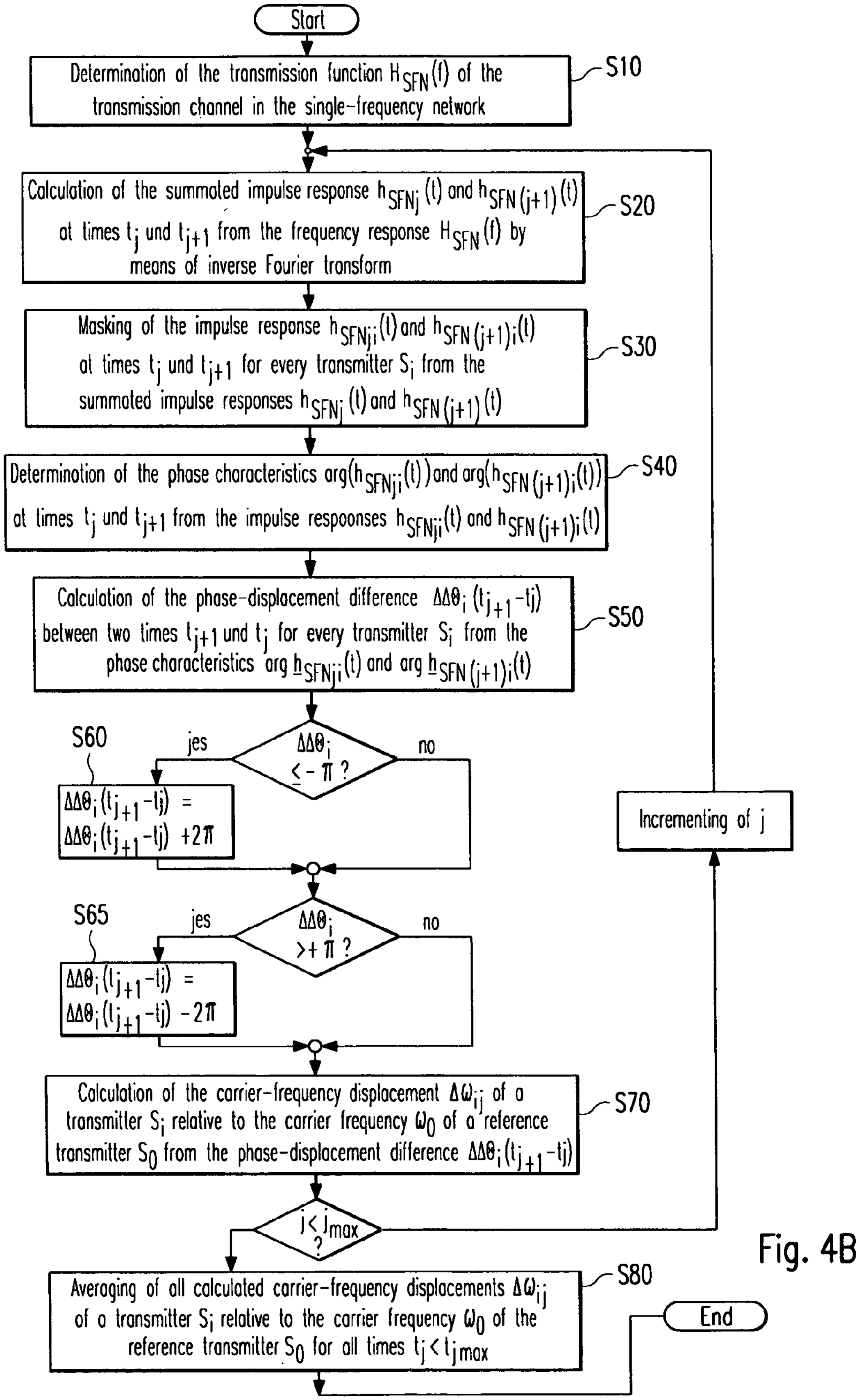
FIG. 4B shows a flow chart explaining the second embodiment of the method according to the invention for monitoring the carrier-frequency stability of transmitters in a single-frequency network.
Figure 5A:
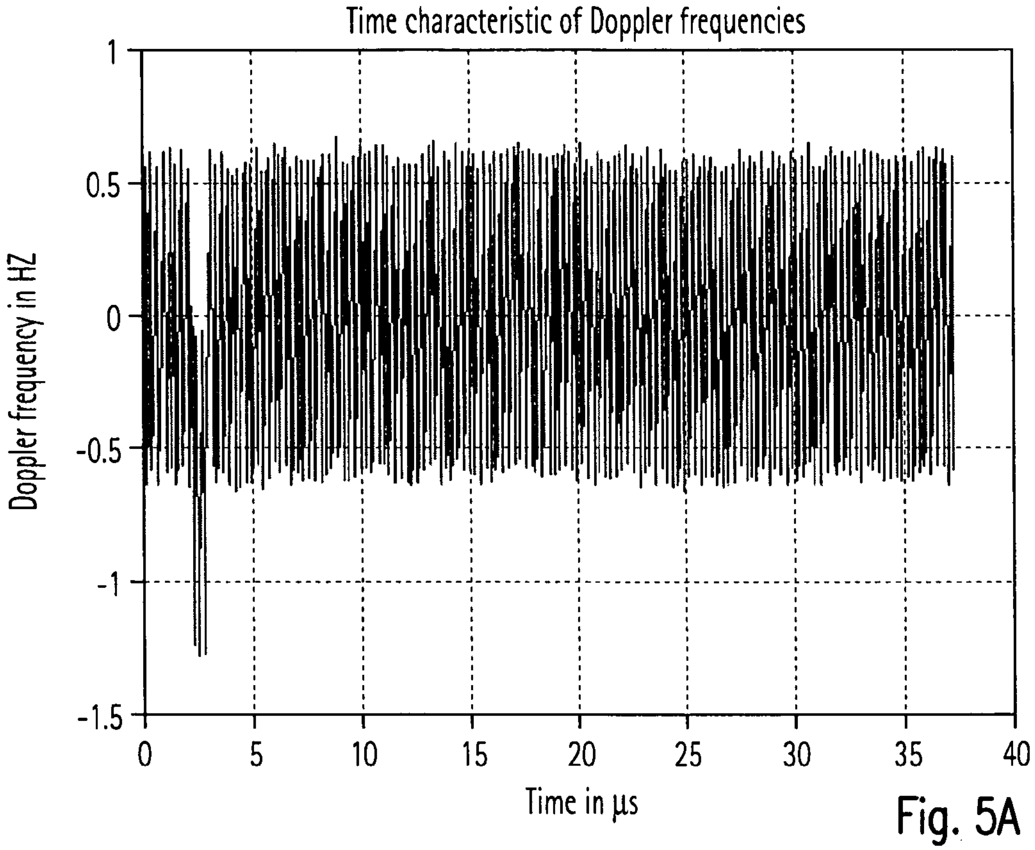
FIG. 5A shows an exemplary presentation of results for the first embodiment of the method according to the invention for monitoring the carrier-frequency stability of transmitters in a single-frequency network.

Since, over the time t, additional phase changes resulting, for example, from phase noise, can be superimposed over the phase displacement $\Delta\theta_i(t)$ of the received signal $e_i(t)$ of the transmitter $S_i$, as a result of a carrier-frequency displacement $\Delta\omega_i$ of the transmitter $S_i$ relative to the reference transmitter $S_0$, as illustrated in FIG. 5A, phase disturbances of this kind should be removed from the phase-displacement difference $\Delta\Delta\Theta_i(t_{B2}-t_{B1})$ of the phase displacement of the transmitter $S_i$ relative to the reference transmitter $S_0$ between the two observation times $t_{B1}$ and $t_{B2}$. This adjustment is provided in the second embodiment of the method according to the invention for monitoring the carrier frequency stability of transmitters in a single-frequency network as illustrated in FIG. 4B.

The first embodiment shown in FIG. 4A differs from the second embodiment shown in FIG. 4B, in that the phase-displacement difference $\Delta\Delta\Theta_i(\Delta t_B)$ of the phase displacement of the transmitter $S_i$ relative to the reference transmitter $S_0$ within a time interval $\Delta t_B$ is determined, in procedural stage S50, not only between the observation times $t_{B1}$ and $t_{B2}$, but at several other observation times $t_{Bj}$ and $t_{B(j+1)}$, which, according to equation (17), are separated from one another by a time interval $\Delta t_B$.

$$\Delta t_B=t_{B(j+1)}-t_{Bj} \text{ for values of } j=1, 2, 3, \ldots \quad (17)$$

For this purpose, the time-discrete characteristic of the complex, summated impulse response $h_{SFNj}(t)$ and $h_{SFN(j+1)}(t)$ is determined in procedural stage S20 respectively at observation times $t_j$ and $t_{(j+1)}$.

Similarly, in procedural stage S30, the time-discrete characteristics of the complex impulse responses $h_{SFNji}(t)$ and $h_{SFN(j+1)i}(t)$ of the respective transmitter $S_i$ at the times $t_j$ and $t_{(j+1)}$ are masked out from the time-discrete characteristics of the complex, summated impulse responses $h_{SFNji}(t)$ and $h_{SFN(j+1)i}(t)$.

Finally, in procedural stage S40, the phase characteristics $\arg(h_{SFNji}(t))$ and $\arg(h_{SFN(j+1)i}(t))$ of the transmitter $S_i$ at the times $t_j$ and $t_{(j+1)}$ are determined from the time-discrete characteristics of the complex impulse responses $h_{SFNji}(t)$ and $h_{SFN(j+1)i}(t)$.

The subtraction of the phase characteristic $\arg(h_{SFNji}(t))$ from the phase characteristic $\arg(h_{SFN(j+1)i}(t))$ in procedural stage S50 leads to the phase-displacement difference $\Delta\Delta\Theta_i(t_{B(j+1)}-t_{Bj})$ of the phase displacement of the respective transmitter $S_i$ relative to the reference transmitter $S_0$ between the times $t_{B(j+1)}$ and $t_{Bj}$, which corresponds to the difference in the phase displacement $\Delta\Theta_i(t_{B(j+1)})$ at the time $t_{B(j+1)}$ and the phase displacement $\Delta\Theta_i(t_{Bj})$ at time $t_{Bj}$ of the transmitter $S_i$ relative to the reference transmitter $S_0$.

The limitation of the phase-displacement difference $\Delta\Delta\Theta_i(t_{B(j+1)}-t_{Bj})$ of the phase displacement of the respective transmitter $S_i$ relative to the reference transmitter $S_0$ between the times $t_{B(j+1)}$ and $t_{Bj}$ to the acceptable value range between $-\pi$ and $+\pi$ takes place in procedural stages S60 and S65.

In procedural stage S70, the carrier-frequency displacement $\Delta\omega_{ij}$ of the transmitter $S_i$ is calculated on the basis of the phase-displacement difference $\Delta\Delta\Theta_i(t_{B(j+1)}-t_{Bj}))$ of the phase displacement at the observation times $t_j$ and $t_{j+1}$, from the phase-displacement difference $\Delta\Delta\Theta_i(t_{B(j+1)}-t_{Bj})$ of the phase displacement of the respective transmitter $S_i$ relative to the reference transmitter $S_0$ between the times $t_{B(j+1)}$ and $t_{Bj}$.

The carrier-frequency displacement $\Delta\omega_{ij}$ of the transmitter $S_i$ relative to the reference transmitter $S_0$ is determined on the basis of the phase-displacement difference $\Delta\Delta\Theta_i(t_{B(j+1)}-t_{Bj})$ of the phase displacement at the observation times $t_j$ and $t_{j+1}$, at different observation times $t_j$ and $t_{j+1}$, altogether $j_{max}$-times, and calculated.

The total of $j_{max}$ calculated carrier-frequency displacements $\Delta\omega_{ij}$ of the transmitter $S_i$ relative to the reference transmitter $S_0$ is then supplied, in procedural stage S80, for averaging, in order to remove or minimise the influence on the carrier-frequency displacement $\Delta\omega_I$ of the above-named phase disturbances, for example, based on phase noise.

The averaging can also take place in the form of a pipeline structure, wherein the oldest value in each case is rejected. Recursive averaging is a memory saving variant.

Figure 5B:
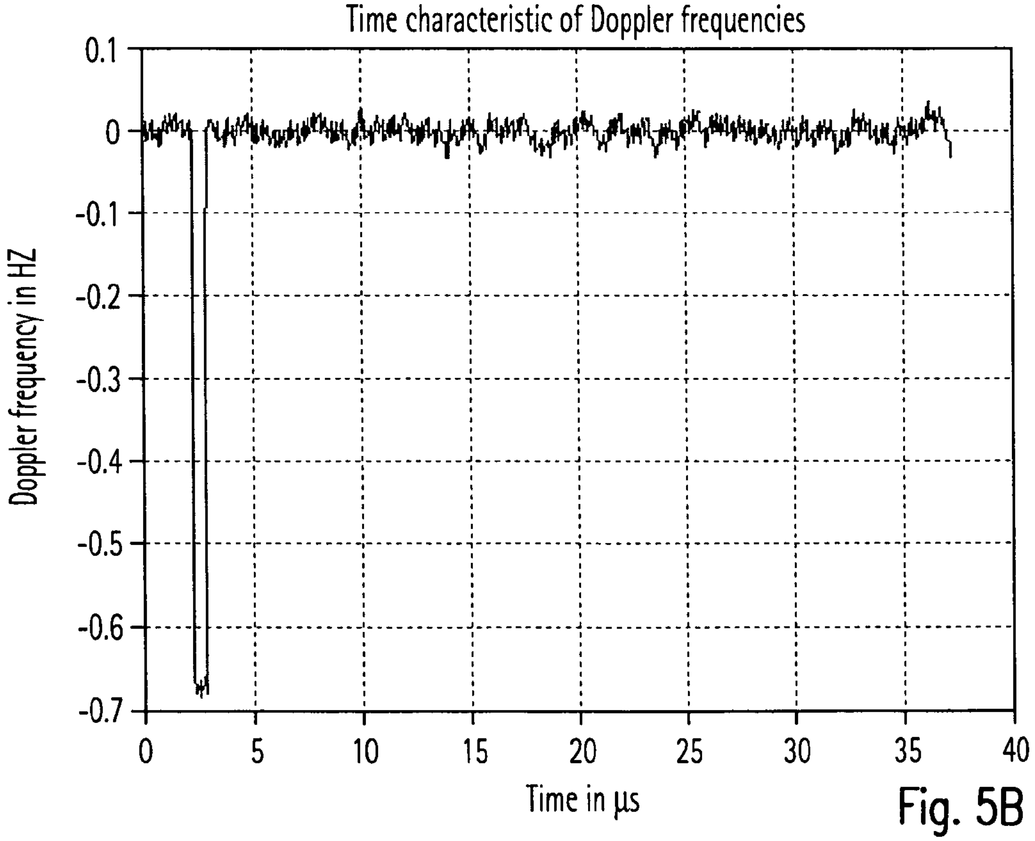
FIG. 5B shows an exemplary presentation of results for the second embodiment of the method according to the invention for monitoring the carrier-frequency stability of transmitters in a single-frequency network.

An exemplary characteristic of a carrier-frequency displacement $\Delta\omega_i$ of a transmitter $S_i$ relative to a reference transmitter $S_0$ is shown in FIG. 5B.

A device for monitoring the carrier frequency stability of several transmitters in a single-frequency network is shown in FIG. 1.

The single-frequency network shown in FIG. 1 consists, for example, of the five transmitters $S_1$, $S_2$, $S_3$, $S_4$ and $S_5$. The transmitted signals of the transmitters $S_1$ to $S_5$ are received by a receiver device E. The receiver device E is connected to an electronic data-processing unit 1. In a unit 11 for determining the transmission function of the transmission channel, the transmission function $H_{SFN}(f)$ of the transmission channel of the transmitters $S_1$ to $S_5$ to the receiver device E is determined on the basis of the transmitted signals received by the receiver device E from the transmitters $S_1$ to $S_5$. In this context, use is made of the coefficients of the equaliser integrated in the receiver device E, which correspond, in the case of an equaliser calibrated to the transmission channel, to the coefficients of the transmission function of the transmission channel.

Alternatively, in the case of digital terrestrial TV, the transmission function $H_{SFN}(f)$ of the transmission channel from the transmitters $S_1$ to $S_5$ to the receiver device E can be determined from the scattered pilot carriers of a DVB-T signal, thereby bypassing the unit 11.

In a subsequent unit 12 for the implementation of the inverse Fourier transform, the time-discrete characteristics of the complex, summated impulse responses $h_{SFNj}(t)$ and $h_{SFN(j+1)}(t)$ are calculated at the observation times $t_{Bj}$ and $t_{B(j+1)}$ from the transmission function $H_{SFN}(f)$ of the transmission channel.

In a subsequent unit 13 for masking the impulse response for every transmitter out of the summated impulse response, the time-discrete characteristics of the complex impulse responses $h_{SFNji}(t)$ and $h_{SFN(j+1)i}(t)$ for every transmitter $S_i$ of the single-frequency network at times $t_{Bj}$ and $t_{B(j+1)}$ are masked out from the time-discrete characteristics of the complex summated impulse responses $h_{SFNj}(t)$ and $h_{SFN(j+1)}(t)$.

In a subsequent unit 14 for determining the phase characteristic of the impulse response, the time-discrete phase characteristics $\arg(h_{SFNji}(t))$ and $\arg(h_{SFN(j+1)i}(t))$ of the impulse responses $h_{SFNji}(t)$ and $h_{SFN(j+1)i}(t)$ at times $t_{Bj}$ and $t_{Bj+1}$ are calculated from the time-discrete characteristics of the complex impulse responses $h_{SFNji}(t)$ and $h_{SFN(j+1)i}(t)$.

In a subsequent unit 15 for calculating the difference in phase displacement and carrier-frequency displacement of every transmitter relative to the carrier frequency of a reference transmitter from the time-discrete phase characteristics $\arg(h_{SFNji}(t))$ and $\arg(h_{SFN(j+1)i}(t))$ of the impulse responses $h_{SFNji}(t)$ and $h_{SFN(j+1)i}(t)$ at the times $t_j$ and $t_{j+1}$, the phase-displacement difference $\Delta\Delta\Theta_i(t_{B(j+1)-tBj})$ of the phase displacements of a transmitter $S_i$ relative to a reference transmitter $S_0$ at the observation times $t_{Bj}$ and $t_{B(j+1)}$ is calculated; this corresponds to the difference in the phase displacement $\Delta\Theta_i(t_{Bj})$ and $\Delta\Theta_i(t_{B(j+1)})$ of the transmitter $S_i$ relative to the reference transmitter $S_0$ at the times $t_{Bj}$ and $t_{B(j+1)}$, and on this basis, the carrier-frequency displacement $\Delta\omega_{ij}$ for every transmitter $S_i$ relative to a reference transmitter $S_0$ is derived with reference to a determined phase-displacement difference $\Delta\Delta\Theta_i(t_{B(j+1)}-t_{Bj})$ of the phase displacements at observation times $t_{Bj}$ and $t_{B(j+1)}$.

In a unit 2 for the tabular and/or graphic presentation of the carrier-frequency displacement $\Delta\omega_i$ of all transmitters $S_i$, which is connected to the electronic data processing unit 1, the carrier-frequency displacements $\Delta\omega_i$ of every transmitter $S_i$ relative to a reference transmitter $S_0$ of the single-frequency network are presented either in tabular or graphic form.

Figure 6A:
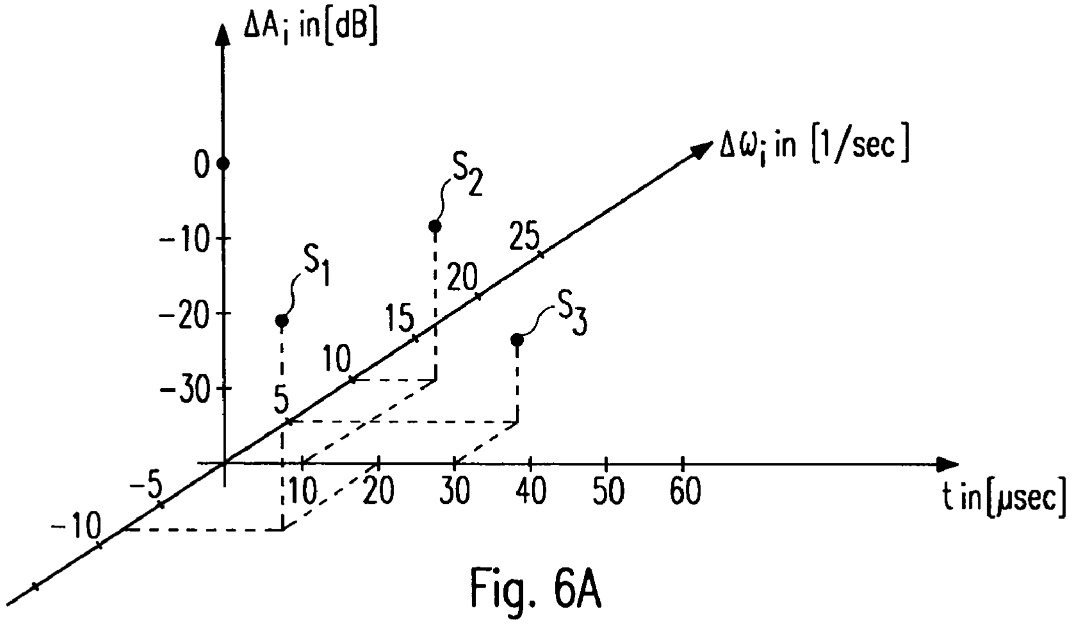
FIG. 6A shows an exemplary three-dimensional graphic presentation of the amplitude deviation and carrier-frequency deviation and FIG. 6B shows an exemplary two dimensional graphic presentation of the amplitude deviation and carrier-frequency deviation.
Figure 6B:
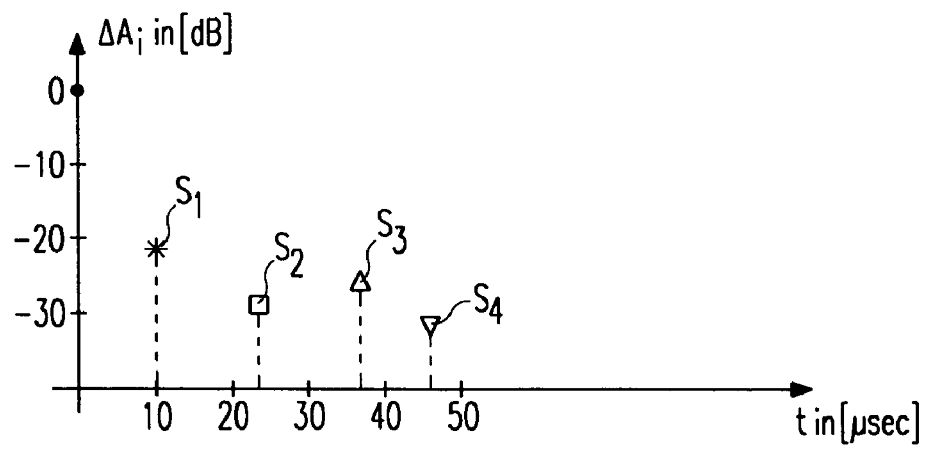

Regarding the simultaneous presentation of the amplitude deviation and the carrier-frequency deviation of a transmitter $S_i$ relative to a reference transmitter $S_0$ at a given observation time $t_{Bi}$ in a graphic display, on the one hand, a three-dimensional presentation can be provided, with time t as a first dimension, frequency deviation $\Delta\omega_i$ of the respective transmitter $S_i$ relative to the carrier frequency $\omega_0$ of the reference transmitter $S_0$ as a second dimension and finally the amplitude deviation $\Delta A_i$ of the respective transmitter $S_i$ relative to the amplitude $A_i$ of the reference transmitter $S_0$ as a third dimension. If the reference transmitter $S_0$ is set in the three-dimensional graphic display scaled to its amplitude $A_0$ at time t=0, each transmitter $S_i$ is represented, as shown in FIG. 6A, by a point in the graphic display corresponding to the respective amplitude and carrier-frequency deviation $\Delta A_i$ and $\Delta\omega_i$. On the other hand, in the case of a two-dimensional presentation, as shown in FIG. 6B, the time t is plotted on the abscissa and the amplitude $A_0$ of the respective reference transmitter $S_0$ is plotted on the ordinate, while the carrier frequency deviation $\Delta\omega_i$ of the respective transmitter $S_i$ relative to the carrier frequency $\omega_0$ of the reference transmitter $S_0$ is characterised by a symbol for the point associated with the respective transmitter $S_i$ corresponding to the carrier frequency deviation Δωi. Once again, the amplitude $A_0$ of the reference transmitter $S_0$ is entered in the graphic display at time t=0.

The invention is not restricted to the exemplary embodiments presented and described. In particular, all of the features described can be combined freely with one another. The method described is also suitable not only for signals of the DAB or DVB-T standards, but also for all standards, which allow SFN, especially, including signals of the American ATSC standard.

What is claimed is:

1. A method for monitoring stability of a carrier frequency ($\omega_i$) of identical transmitted signals ($s_i(t)$) of several transmitters ($S_1, \ldots, S_i, \ldots, S_n$) of a single-frequency network comprising:

receiving, by a receiver device (E) positioned within the transmission range of the single-frequency network, a signal ($e_i(t)$) associated with a transmitted signal ($s_i(t)$) of a transmitter ($S_i$) and a reference signal ($e_0(t)$) of a reference transmitter ($S_0$);

evaluating a phase position of the received signal ($e_i(t)$) associated with the transmitted signal ($s_i(t)$) of the transmitter ($S_i$) with reference to the received signal ($e_0(t)$) of the reference transmitter ($S_0$); and calculating a carrier-frequency displacement ($\Delta\omega_i$) of a carrier frequency ($\omega_i$) of a transmitter ($S_i$) relative to a reference carrier frequency ($\omega_0$) of the reference transmitter ($S_0$) from a phase-displacement difference ($\Delta\Delta\theta_i(t_{B2}-t_{B1})$) caused by the carrier-frequency displacement ($\Delta\omega_i$) of this transmitter between a phase displacement ($\Delta\theta_i(t_{B2})$) at least at one second observation time ($t_{B2}$) and a phase displacement ($\Delta\theta_i(t_{B1})$) at a first observation time of a received signal ($e_i(t)$) of this transmitter ($S_i$) associated with the transmitted signal ($s_i(t)$) relative to a received signal ($e_0(t)$) of the reference transmitter ($S_0$) associated with the transmitted signal ($s_0(t)$).

2. A method for monitoring the stability of the carrier frequency according to claim 1, wherein said calculating includes:

determining a transmission function ($H_{SFN}(f)$) of the transmission channel from the transmitters ($S_1, \ldots, S_i, \ldots, S_n$) to the receiver device (E), calculating a characteristic of a complex, time-discrete, summated impulse response ($h_{SFN1}(t)$) at the first observation time ($t_{B1}$) and a characteristic of a complex, time-discrete, summated impulse response ($h_{SFN2}(t)$) at the second observation time ($t_{B2}$) of the transmission channel respectively from the transmission function ($H_{SFN}(f)$) of the transmission channel, masking a characteristic of a complex impulse response ($h_{SFN1i}(t)$) at the first observation time ($t_{B1}$) and of a characteristic of a complex impulse response ($h_{SFN2i}(t)$) at the second observation time ($t_{B2}$) for every transmitter ($S_i$) of the single-frequency network respectively from the characteristic of the complex, summated impulse response ($h_{SFN1}(t)$) at the first observation time ($t_{B1}$) and from the characteristic of the complex, summated impulse response ($h_{SFN2}(t)$) at the second observation time ($t_{B2}$), determining a phase characteristic ($\arg(h_{SFN1i}(t))$) of the complex impulse response ($h_{SFN1i}(t)$) at the first observation time ($t_{B1}$) and of a phase characteristic ($\arg(h_{SFN2i}(t))$) of the complex impulse response ($h_{SFN2}(t)$) at the second observation time ($t_{B2}$) for every transmitter ($S_i$) of the single-frequency network, and calculating the phase-displacement difference $\Delta\Delta\theta_i(t_{B2}-t_{B1})$)) between a phase displacement ($\Delta\theta_i(t_{B2})$) at the second observation time ($t_{B2}$) and a phase displacement ($\Delta\theta_i(t_{B1})$) at the first observation time ($t_{B1}$) by subtraction of a phase characteristic ($\arg(h_{SFN1i}(t))$)) of the complex impulse response ($\arg(h_{SFN1i}(t))$ at the first observation time ($t_{B1}$) from a phase characteristic ($\arg(h_{SFN2}(t))$)) of the complex impulse response ($h_{SFN1i}(t)$) at the second observation time ($t_{B2}$) of the respective transmitter ($S_i$).

3. A method for monitoring the stability of the carrier frequency according to claim 2, further comprising:

increasing the phase-displacement difference ($\Delta\Delta\theta_i(t_{B2}-t_{B1})$) by the factor $2*\pi$ in the case of a decrease in the phase-displacement difference ($\Delta\Delta\theta_i(t_{B2}-t_{B1})$) to the value $-\pi$ or below and reducing the phase-displacement difference ($\Delta\Delta\theta_i(t_{B2}-t_{B1})$) by the factor $-2*\pi$ in the case of an increase in the phase-displacement difference ($\Delta\Delta\theta_i(t_{B2}-t_{B1})$) above the value $\pi$.

4. A method for monitoring the stability of the carrier frequency according to claim 2, further comprising:

determining, in the case of digital terrestrial TV, the transmission function of the transmission channel from the transmitters ($S_1, \ldots, S_i, \ldots, S_n$) to the receiver device (E) from the DVB-T symbols of scattered pilot carriers of received signals ($e_i(t)$) of the transmitters ($S_1, \ldots, S_i, \ldots, S_n$) modulated according to the orthogonal-frequency-division-multiplexing (OFDM) method.

5. A method for monitoring the stability of the carrier frequency according to claim 2, wherein:

said calculating the characteristic of a complex, time-discrete, summated impulse response $h_{SFN1/2}(t)$ at the discrete first observation time $t_{B1}$ of the transmission channel is derived from the transmission function $H_{SFN}(f)$ of the transmission channel using the Fourier transform according to the formula:

$$h_{SFN1/2}(t) = \sum_{k=0}^{N_F-1} H_{SFN}(k) * e^{j2\pi kt/N_F}$$

wherein $H_{SFN}(f)$ denotes the transmission function or respectively the frequency response of the transmission channel, $N_F$ denotes the number of sampling values for the discrete Fourier transform, k denotes the discrete frequency values, t denotes the sampling times of the time-discrete, summated impulse response of the transmission channel and ½ denotes the index for the observation time $t_{B1}$ or respectively $t_{B2}$.

6. A method for monitoring the stability of the carrier frequency according to claim 5, wherein:

said calculating the phase-displacement difference ($\Delta\Delta\theta_i(t_{B2}-t_{B1})$) for each transmitter $S_i$ of the single-frequency network is derived according to the formula:

$$\Delta\Delta\theta_i(t_{B2}-t_{B1}) = \arg(h_{SFN2i}(t)) - \arg(h_{SFN1i}(t))$$

wherein i denotes the index for the transmitter $S_i$ $\arg(h_{SFN2i}(t))$ denotes the phase characteristic of the complex impulse response $h_{SFN2i}(t)$ at the observation time $t_{B2}$ of the transmitter $S_i$ and $\arg(h_{SFN1i}(t))$ denotes the phase characteristic of the complex impulse response $h_{SFN1i}(t)$ at the observation time $t_{B1}$ of the transmitter $S_i$.

7. A method for monitoring the stability of the carrier frequency according to claim 6, wherein:

said calculating the carrier-frequency displacement $\Delta\omega_i$ of the transmitter $S_i$ relative to the carrier frequency $\omega_0$ of the reference transmitter of the single-frequency network is derived according to the formula:

$$\Delta\omega_i = \Delta\Delta\theta_i(t_{B2}-t_{B1})/(t_{B2}-t_{B1})$$

wherein i denotes the index for the transmitter $S_i$, $\Delta\Delta\theta_i(t_{B2}-t_{B1})$ denotes the phase position difference $\Delta\Delta\theta_i(t_{B2}-t_{B1})$ for the transmitter $S_i$ of the single-frequency network and $t_{B1}$, $t_{B2}$ denote the observation times.

8. A method for monitoring the stability of the carrier frequency according to claim 7, further comprising performing the following steps repeatedly:

calculating the characteristic of the complex, time-discrete, summated impulse response $h_{SFNj}(t)$ and $(h_{SFN(j+1)}(t)$ at the observation times $t_{Bj}$ and $t_{B(j+1)}$, masking the characteristic of the complex impulse response $h_{SFNji}(t)$ and $h_{SFN(j+1)i}(t)$ at the observation times $t_{Bj}$ and $t_{B(j+1)}$ for every transmitter $S_i$ of the single-frequency network, determining the phase characteristics $\arg(h_{SFNji}(t)$ and $\arg(h_{SFN(j+1)i}(t))$ of the complex impulse responses $h_{SFNji}(t)$ and $h_{SFN(j+1)i}(t))$ at the observation times $t_{Bj}$ and $t_{B(j+1)}$, calculating the phase-displacement difference $(\Delta\Delta\theta_i(t_{B(j+1)}-t_{Bj}))$ between the phase displacement $\Delta\theta_i(t_{B(j+1)})$ at the observation time $t_{B(j+1)}$ and the phase displacement $\Delta\theta_i(t_{Bj})$ at the observation time $t_{Bj}$ for every transmitter $S_i$ of the single-frequency network, increasing the phase-displacement difference $\Delta\Delta\theta_i(t_{B(j+1)}-t_{Bj})$ by the factor $2*\pi$ in the case of a decrease in the phase-displacement difference $(\Delta\Delta\theta_i(t_{B(j+1)}-t_{Bj}))$ to the value $-\pi$ or below, reducing the phase-displacement difference $(\Delta\Delta\theta_i(t_{B(j+1)}-t_{Bj}))$ by the factor $-2*\pi$ in the case of an increase in the phase-displacement difference $\Delta\Delta\theta_i(t_{B(j+1)}-t_{Bj})$ above the value $\pi$ and calculating the carrier-frequency displacement $\Delta\omega_{ij}$ of the transmitter $S_i$ relative to the carrier frequency $\omega_0$ of the reference transmitter of the single-frequency network at several observation times $t_{Bj}$; and averaging all carrier-frequency displacements $\Delta\omega_{ij}$ of every transmitter $S_i$ relative to the carrier frequency $\omega_0$ of the reference transmitter $S_0$ of the single-frequency network calculated respectively in procedural stage (S70), is implemented at the observation times $t_{Bj}$.

9. A method for monitoring the stability of the carrier frequency according to claim 8, wherein said averaging all carrier-frequency displacements $\Delta\omega_{ij}$ of every transmitter $S_i$ relative to the carrier frequency $\omega_0$ of a reference transmitter $S_0$ of the single-frequency network calculated in procedural stage (S70), is implemented using a recursive method.

10. A device for monitoring the stability of the carrier frequency $(\omega_i)$ of identical transmitted signals $s_i(t)$ of several transmitters $(S_1, \ldots, S_i, \ldots, S_n)$ of a single-frequency network comprising:

a receiver device, a unit for determining a transmission function $H_{SFN}(f)$ of a transmission channel of several transmitters $(S_1, \ldots, S_i, \ldots, S_n)$ of the single-frequency network to the receiver device disposed within the transmission range of the single-frequency network, a unit for implementing an inverse Fourier transform, a unit for masking an impulse response $(h_{SFNi}(t))$ for every transmitter $(S_i)$ from the summated impulse response $(h_{SFN}(t))$, a unit for determining the phase characteristic $(\arg(h_{SFNi}(t)))$ of the impulse response $(h_{SFNi}(t))$ for every transmitter $(S_i)$, a unit for calculating the phase-displacement difference $\Delta\Delta\theta_i(t_{B(j+1)}-t_{Bj}))$ of the phase displacement $(\Delta\Theta_i)$ of a transmitter $(S_i)$ relative to a reference transmitter $(S_0)$ at least at two different times $((t_{B1},-t_{Bj+1}))$ and the carrier-frequency displacement $(\Delta\omega_i)$ of every transmitter $(S_i)$ relative to the carrier frequency $(\omega_0)$ of the reference transmitter $(S_0)$, and a unit for presenting the calculated carrier-frequency displacement $(\Delta\omega_i)$ of every transmitter $(S_i)$ relative to the carrier frequency $(\omega_0)$ of the reference transmitter $(S_0)$ of the single-frequency network, wherein the unit for presenting comprises a tabular and/or graphic display device.

11. A device for monitoring the stability of the carrier wave $(\omega_i)$ of identical transmitted signals $s_i(t)$ of several transmitters $(S_1, \ldots, S_i, \ldots, S_n)$ of a single-frequency network comprising:

a receiver device, a unit for determining a transmission function $(H_{SFN}(f))$ from pilot carriers of the received signal $(e_i(t))$, a unit for masking an impulse response $(h_{SFNi}(t))$ for every transmitter $(S_i)$ from the summated impulse response $(h_{SFN}(t))$, a unit for determining the phase characteristic $(\arg(h_{SFNi}(t))$ of the impulse response $(h_{SFNi}(t))$ for every transmitter $(S_i)$, a unit for calculating the phase-displacement difference $(\Delta\Delta\theta_i(t_{B(j+1)}-t_{Bj}))$ of the phase displacement $\Delta\Delta\theta_i$ of a transmitter $(S_i)$ relative to a reference transmitter $(S_0)$ at least at two different times $(t_{Bj}-t_{B(j+1)})$ and the carrier-frequency displacement $(\Delta\omega_i)$ of every transmitter relative to the carrier frequency $(\omega_0)$ of the reference transmitter $(S_0)$, and a unit for presenting the calculated carrier-frequency displacement $(\Delta\omega_i)$ of every transmitter $(S_i)$ relative to the carrier frequency $(\omega_0)$ of the reference transmitter $(S_0)$ of the single-frequency network.

* * * * *